US010642447B2

(12) United States Patent
Tsukazaki et al.

(10) Patent No.: US 10,642,447 B2
(45) Date of Patent: May 5, 2020

(54) REPRODUCTION DEVICE AND DISPLAY CONTROL METHOD

(75) Inventors: Hideo Tsukazaki, Tokyo (JP); Kotaro Asaka, Tokyo (JP); Takashi Kinouchi, Tokyo (JP); Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 13/485,478

(22) Filed: May 31, 2012

(65) Prior Publication Data
US 2012/0240047 A1 Sep. 20, 2012

Related U.S. Application Data

(63) Continuation of application No. 11/489,870, filed on Jul. 20, 2006, now Pat. No. 8,219,928.

(30) Foreign Application Priority Data

Jul. 28, 2005 (JP) .................................. 2005-219663
Oct. 25, 2005 (JP) .................................. 2005-309796

(51) Int. Cl.
*G06F 3/048* (2013.01)
*G06F 3/0482* (2013.01)
(Continued)

(52) U.S. Cl.
CPC .......... *G06F 3/0482* (2013.01); *G11B 27/105* (2013.01); *G11B 27/329* (2013.01); *G11B 27/34* (2013.01); *Y10S 707/99948* (2013.01)

(58) Field of Classification Search
CPC ..................................................... G06F 3/048
(Continued)

(56) References Cited

U.S. PATENT DOCUMENTS 4,667,314 A 5/1987 Iwashima
5,544,360 A 8/1996 Lewak et al.
(Continued)

FOREIGN PATENT DOCUMENTS

CN 1300501 A 6/2001
CN 1332927 A 1/2002
(Continued)

OTHER PUBLICATIONS

[No Author Listed] Windows Media Player 9 Example (WMP9 on XP—Broadband.m4v). Feb. 3, 2014, XP054975397, Retrieved from the Internet: URL: http://www.dropbox.com/s/x01mnuvwgdrdttj/ WMP9%20on%20XP%20-%20Broadband.m4v. 1 page.
(Continued)

*Primary Examiner* — Tadesse Hailu
*Assistant Examiner* — Darrin Hope
(74) *Attorney, Agent, or Firm* — Wolf, Greenfield & Sacks, P.C.

(57) ABSTRACT

A reproduction device including a reproduction unit configured to reproduce content data including at least one of audio, video, and text for which attribute data is assigned for each of a different plurality of attributes; a display unit; and a control unit configured to make the display unit display a playback screen containing at least one attribute data among the plurality of attribute data assigned to the content data when reproducing the content data and, when one attribute data among the attribute data composing the playback screen is selected, switch the display content of the content from the playback screen to the list relating to the selected attribute data.

19 Claims, 16 Drawing Sheets

MUSIC LIBRARY SCREEN

(51) Int. Cl.
  *G11B 27/34* (2006.01)
  *G11B 27/10* (2006.01)
  *G11B 27/32* (2006.01)

(58) Field of Classification Search
  USPC .................................................. 715/716, 825
  See application file for complete search history.

(56) References Cited

U.S. PATENT DOCUMENTS

| | | | |
|---|---|---|---|
| 5,731,852 A | 3/1998 | Lee | |
| 5,852,593 A | 12/1998 | Ishida et al. | |
| 5,945,987 A | 8/1999 | Dunn | |
| 6,243,725 B1 | 6/2001 | Hempleman et al. | |
| 6,262,724 B1 | 7/2001 | Crow et al. | |
| 6,502,194 B1 | 12/2002 | Berman et al. | |
| 6,519,648 B1 | 2/2003 | Eyal | |
| 6,522,347 B1 | 2/2003 | Tsuji et al. | |
| 6,536,037 B1 | 3/2003 | Guheen et al. | |
| 6,760,721 B1 | 7/2004 | Chasen et al. | |
| 6,928,433 B2 | 8/2005 | Goodman et al. | |
| 6,934,812 B1 | 8/2005 | Robbin et al. | |
| 6,996,563 B2 | 2/2006 | Kumagai et al. | |
| 7,017,125 B1 | 3/2006 | Matsumoto | |
| 7,166,791 B2 | 1/2007 | Robbin et al. | |
| 7,216,008 B2 | 5/2007 | Sakata | |
| 7,219,308 B2 | 5/2007 | Novak et al. | |
| 7,761,812 B2 * | 7/2010 | Ostojic et al. | ................. 715/835 |
| 8,219,928 B2 | 7/2012 | Tsukazaki et al. | |
| 8,225,235 B2 | 7/2012 | Takeda et al. | |
| 2001/0002223 A1 | 5/2001 | Watanabe | |
| 2001/0030660 A1 | 10/2001 | Zainoulline | |
| 2002/0002541 A1 | 1/2002 | Williams | |
| 2002/0141096 A1 | 10/2002 | Hayashi | |
| 2002/0147728 A1 | 10/2002 | Goodman | |
| 2002/0156864 A1 | 10/2002 | Kniest | |
| 2002/0160749 A1 | 10/2002 | Nishikawa | |
| 2002/0171691 A1 | 11/2002 | Currans et al. | |
| 2002/0178276 A1 | 11/2002 | McCartney et al. | |
| 2003/0069854 A1 | 4/2003 | Hsu et al. | |
| 2003/0112467 A1 | 6/2003 | McCollum et al. | |
| 2003/0158737 A1 | 8/2003 | Csicsatka | |
| 2004/0055446 A1 * | 3/2004 | Robbin et al. | ................... 84/615 |
| 2004/0075698 A1 | 4/2004 | Gao et al. | |
| 2004/0254883 A1 | 12/2004 | Kondrk et al. | |
| 2005/0021470 A1 | 1/2005 | Martin et al. | |
| 2005/0049941 A1 | 3/2005 | Kaplan | |
| 2005/0060552 A1 | 3/2005 | Sugimura et al. | |
| 2005/0187976 A1 | 8/2005 | Goodman et al. | |
| 2005/0202385 A1 * | 9/2005 | Coward | ............ G06F 17/30899 434/307 R |
| 2005/0204309 A1 | 9/2005 | Szeto | |
| 2006/0008256 A1 | 1/2006 | Khedouri et al. | |
| 2006/0010099 A1 | 1/2006 | Takeda et al. | |
| 2006/0020968 A1 | 1/2006 | Kroll et al. | |
| 2006/0095848 A1 | 5/2006 | Naik | |
| 2006/0168340 A1 | 7/2006 | Heller et al. | |
| 2006/0203620 A1 | 9/2006 | Bedingfield | |
| 2006/0235550 A1 | 10/2006 | Csicsatka et al. | |
| 2007/0008830 A1 | 1/2007 | Tsukazaki et al. | |
| 2007/0031116 A1 | 2/2007 | Takatsuka et al. | |
| 2007/0038941 A1 | 2/2007 | Wysocki et al. | |
| 2014/0157198 A1 | 6/2014 | Tsukazaki et al. | |

FOREIGN PATENT DOCUMENTS

| | | |
|---|---|---|
| EP | 1480219 A1 | 11/2004 |
| EP | 1 724 781 A2 | 11/2006 |
| JP | 01-124993 U | 8/1989 |
| JP | 05-282788 A | 10/1993 |
| JP | 05-325404 A | 12/1993 |
| JP | 07-153244 A | 6/1995 |
| JP | 09-265731 A | 10/1997 |
| JP | 10-074383 A | 3/1998 |
| JP | 10-290413 A | 10/1998 |
| JP | 2884525 B2 | 2/1999 |
| JP | 2993058 B2 | 12/1999 |
| JP | 2000-299829 A | 10/2000 |
| JP | 3099373 B2 | 10/2000 |
| JP | 2001-76415 | 3/2001 |
| JP | 2001-243748 A | 9/2001 |
| JP | 2001-265795 A | 9/2001 |
| JP | 2001-309222 A | 11/2001 |
| JP | 3239383 B2 | 12/2001 |
| JP | 2002-124069 A | 4/2002 |
| JP | 3312632 B2 | 5/2002 |
| JP | 2002-169573 A | 6/2002 |
| JP | 2002-169574 A | 6/2002 |
| JP | 2002-222582 A | 8/2002 |
| JP | 2002-245762 A | 8/2002 |
| JP | 2002-304873 A | 10/2002 |
| JP | 2002-319277 A | 10/2002 |
| JP | 2002-343067 A | 11/2002 |
| JP | 2003-157335 A | 5/2003 |
| JP | 2003-186755 A | 7/2003 |
| JP | 2003-203133 A | 7/2003 |
| JP | 2003-219325 A | 7/2003 |
| JP | 2003-288090 A | 10/2003 |
| JP | 2004-039113 A | 2/2004 |
| JP | 2004-95032 A | 3/2004 |
| JP | 2004-127465 A | 4/2004 |
| JP | 2004-302931 A | 10/2004 |
| JP | 2004-326907 A | 11/2004 |
| JP | 2004-342193 A | 12/2004 |
| JP | 2005-094277 A | 4/2005 |
| JP | 2005-116068 A | 4/2005 |
| JP | 2005-190516 A | 7/2005 |
| JP | 2005-275692 A | 10/2005 |
| JP | 2006-018878 A | 1/2006 |
| WO | WO 02/015182 A1 | 2/2002 |

OTHER PUBLICATIONS

[No Author Listed] Windows Media Player 10. Microsoft. 2004. 211 pages.

Extended European Search Report dated Mar. 11, 2019 in connection with European Application No. 18207867.5.

* cited by examiner

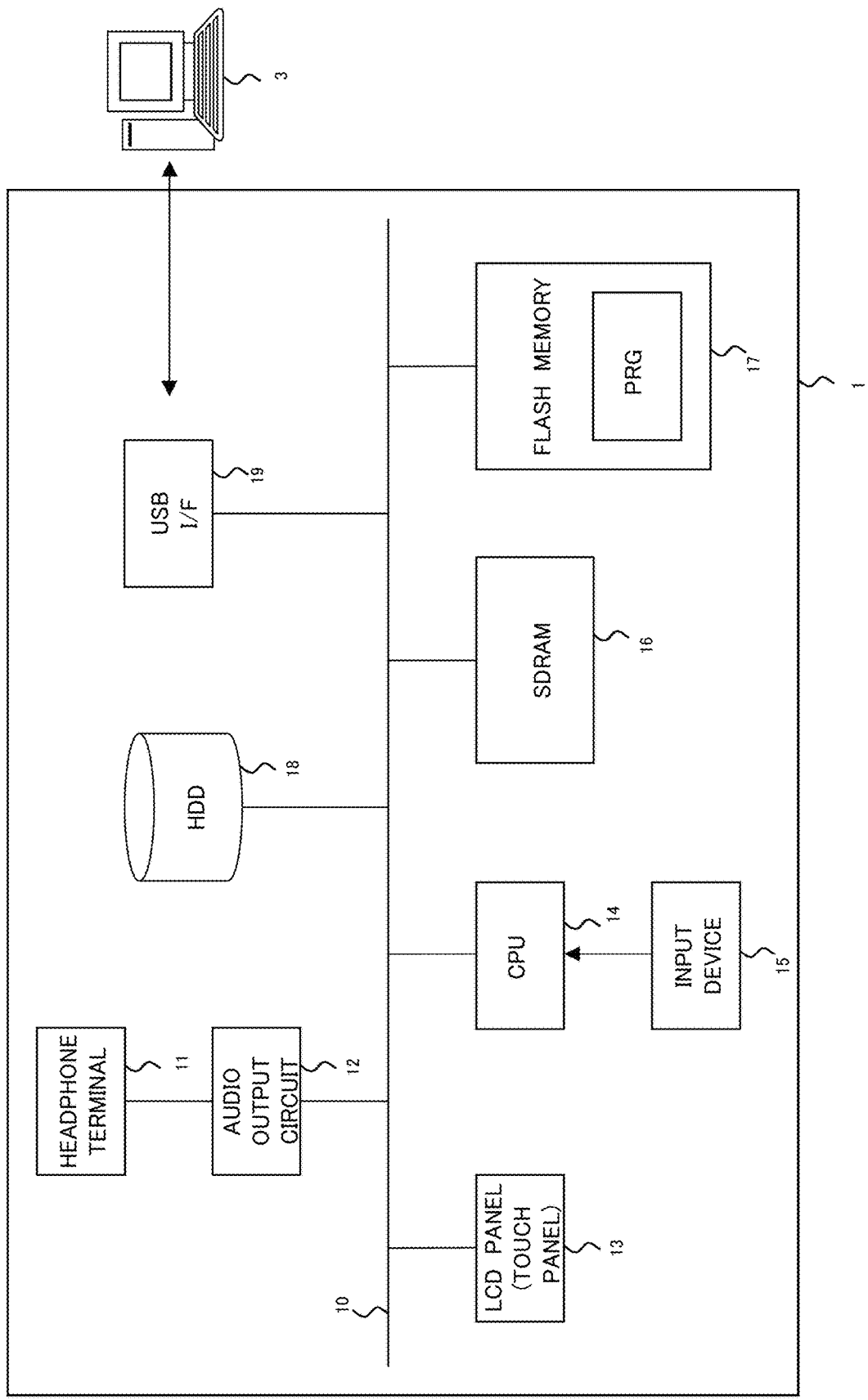

FIG. 3

| ID OF TRACK DATA | ARTIST NAME (ARTIST ID) | ALBUM NAME (ALBUM ID) | GENRE NAME (GENRE ID) | TRACK NAME (CONTENT ID) | |
|---|---|---|---|---|---|
| M_ID1 | AR_N1 | AL_N1 | G_N1 | T_N1 | |
| M_ID2 | AR_N1 | AL_N1 | G_N1 | T_N2 | |
| M_ID3 | AR_N2 | AL_N2 | G_N2 | T_N3 | |
| M_ID4 | AR_N3 | AL_N3 | G_N3 | T_N4 | |
| M_ID5 | AR_N4 | AL_N4 | G_N4 | T_N5 | |
| ⋮ | ⋮ | ⋮ | ⋮ | ⋮ | |

ATTRIBUTES: ARTIST NAME (ARTIST ID)

ATTRIBUTE DATA: ALBUM NAME, GENRE NAME, TRACK NAME columns

MAIN MENU SCREEN

MUSIC LIBRARY SCREEN

ALL SONGS SELECTION SCREEN

ALBUM SELECTION SCREEN

TRACK SELECTION SCREEN

TRACK SELECTION SCREEN

ALBUM SELECTION SCREEN

ARTIST SELECTION SCREEN

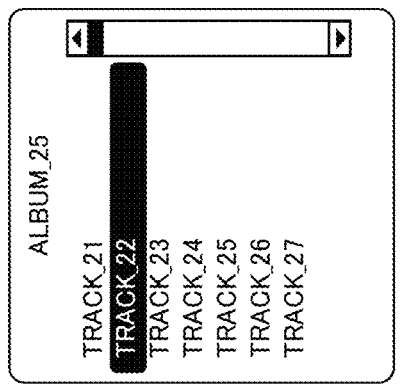
FIG. 10A — GENRE SELECTION SCREEN
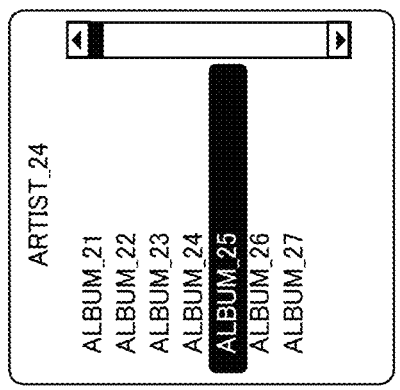
FIG. 10B — ARTIST SELECTION SCREEN
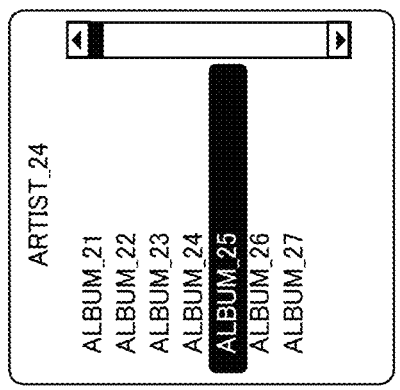
FIG. 10C — ALBUM SELECTION SCREEN
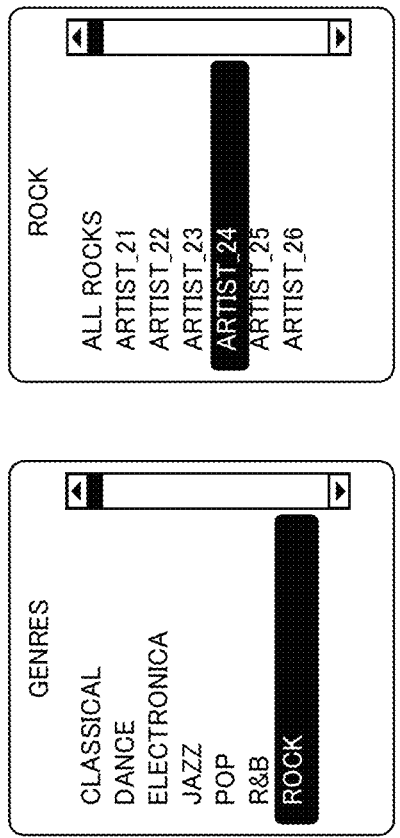
FIG. 10D — TRACK SELECTION SCREEN

RATING SELECTION SCREEN

SONG SELECTION SCREEN

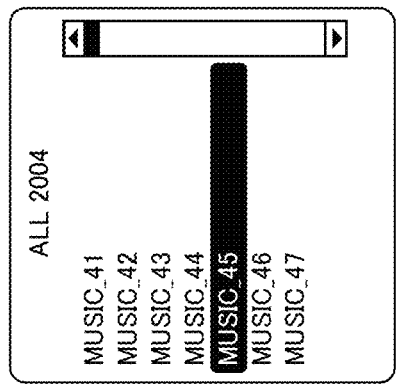
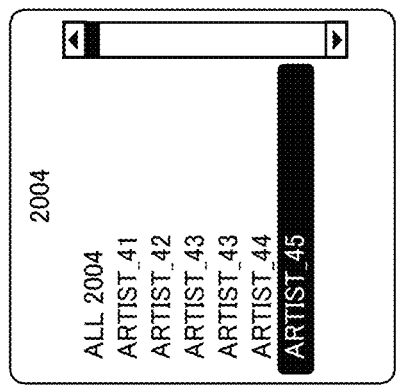
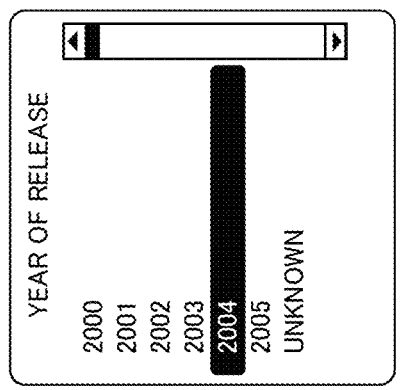

ALBUM SELECTION SCREEN

TRACK SELECTION SCREEN

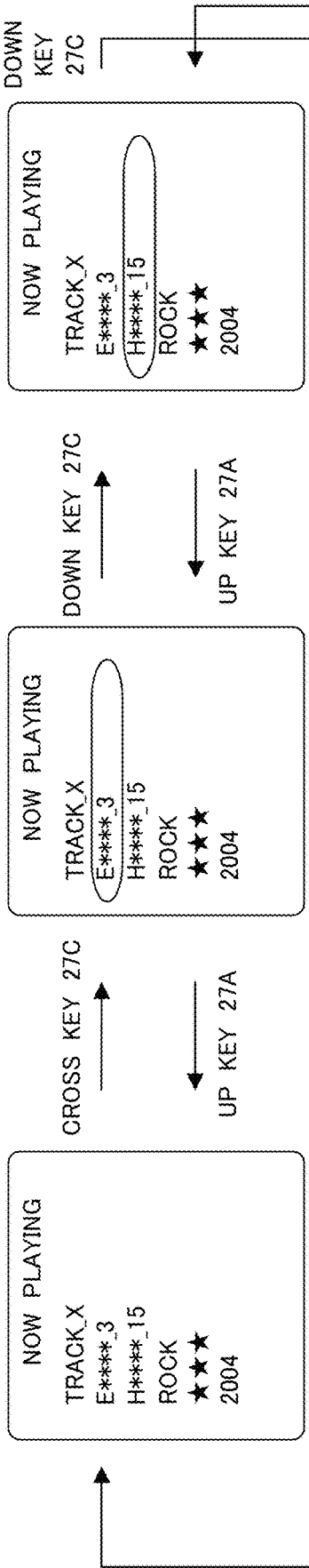

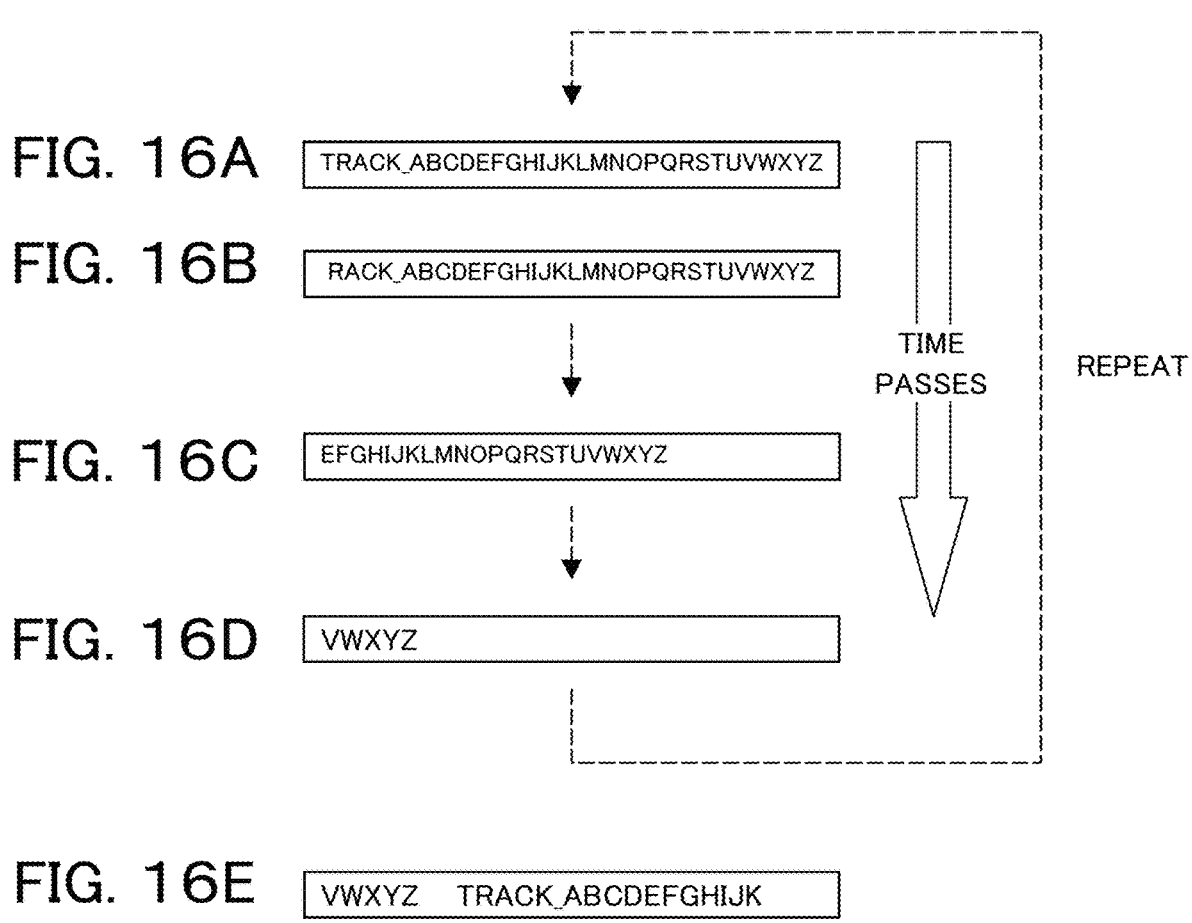

REPRODUCTION DEVICE AND DISPLAY CONTROL METHOD

CROSS REFERENCE TO RELATED APPLICATIONS

This application is a continuation of and claims the benefit under 35 U.S.C. § 120 of U.S. patent application Ser. No. 11/489,870, titled "REPRODUCTION DEVICE AND DISPLAY CONTROL METHOD," filed on Jul. 20, 2006, which claims the benefit under 35 U.S.C. § 119 of Japanese Patent Application No. 2005-309796, filed on Oct. 25, 2005, and Japanese Patent Application No. 2005-219663, filed on Jul. 28, 2005. The entire contents of these applications are hereby incorporated by reference.

BACKGROUND OF THE INVENTION

1. Field of Invention

The present invention relates to a reproduction device and display control method enabling a playback screen to be switched to a list screen corresponding to different attributes.

2. Description of the Art

In recent years, the increasingly greater capacity of recording media and advances made in technology for compression of music, movies, still images, etc. have made it possible to store an enormous amount of content data in the recording medium of a portable player. The increase in the amount of the content data which can be stored in recording media in this way has made it necessary to develop a system for efficiently searching for and displaying the content data desired by the user on the screen. As one such method, there can be explained the method of searching for track names, album names, and artist names of the content data by their initials. For example, when searching by the artist name, the user finds the desired artist name from an alphabetical list of artist names.

In such a portable player, the list of attribute data is hierarchically structured. The user searches for content data desired to be played by for example selecting attributes of tracks to be played one by one from lists of attribute data such as "GENRE", "ARTIST NAME", "ALBUM NAME", and "TRACK NAME". Many such portable players of the art have been designed to display information concerning the content data being played, for example, the artist name, album name, track name, and other attribute data, while playing the content data retrieved by the above procedure.

In such a portable player, however, where it is desired to find and play other content data while playing certain content data, that is, for example, where it is desired to play content data of another album of the same artist as the content data being played, it is necessary to return once to the uppermost menu screen and then again retrieve the content data or redo the retrieval by going back over the lists used for reaching the content data being played (namely in the above case, select another album by going back over the lists in the sequence of "TRACK NAME" and "ALBUM NAME"). Namely, in portable players of the art, there has been no system enabling selection on the playback screen. It was only possible to return to the uppermost menu screen or return to the immediately preceding list screen.

As an example of the art, see Japanese Patent Publication (A) No. 2001-76415.

SUMMARY OF THE INVENTION

In the present invention, it is therefore desirable to provide a reproduction device and display control method enabling a playback screen to be switched to a list screen corresponding to different attributes.

According to a first embodiment of the present invention, there is provided a reproduction device including a reproduction unit configured to reproduce content data including at least one of audio, video, and text for which attribute data is assigned for each of a different plurality of attributes; a display unit; a control unit configured to make the display unit display a playback screen containing at least one attribute data among the plurality of attribute data assigned to the content data when reproducing the content data and, when one attribute data among the attribute data composing the playback screen is selected, switch the display content of the content from the playback screen to the list relating to the selected attribute data.

Preferably, the device further includes an input part for receiving as input an operation content, and the control unit makes the display unit display a playback screen containing at least one attribute data among the plurality of attribute data assigned to the content data when reproducing the content data and switches the display content of the display unit from the playback screen to the list relating to the selected attribute data when one attribute data among the attribute data composing the playback screen is selected based on the operation content input from the input part.

More preferably, the display unit displays a cursor on the playback screen, and the control unit moves the cursor based on the operation content input from the input part and makes the display unit display the list relating to the attribute data selected by the cursor.

Still more preferably, the control unit displays the attribute data by scrolling when the attribute data at which the cursor is arranged, contains a predetermined number or more of letters.

Preferably, the control unit controls the reproduction unit embodiment continue the reproduction of the content data being reproduced even after the display content of the display unit is switched to a list corresponding to the specific attribute during reproduction of the content data.

More preferably, after switching the display content of the display unit to the list corresponding to the specific attribute during reproduction of the content data, the control unit continues the reproduction of the content data being reproduced until reproduction of other content data is instructed.

Preferably, when switching the display content of the display unit from the playback screen to the list relating to the selected attribute data, the control unit places a cursor at attribute data of certain selected content data in the list.

Preferably, when any item of the list being displayed on the display unit is selected, the control unit makes the reproduction unit start the reproduction of the content data corresponding to the selected item, and switches the display content of the display unit from the list to the playback screen containing a plurality of attribute data assigned to the content data.

Preferably, the control unit manages the content data by classifying it into a plurality of hierarchical levels based on the plurality of attributes, makes the display unit display any list of the plurality of lists composed responsive to the attributes, and, when any item is selected from among the displayed lists, makes the reproduction unit reproduce the content data corresponding to the selected item and switches the display content from the list to the playback screen containing the plurality of attribute data assigned to the content data, and, when one attribute data is selected from among the plurality of attribute data on the playback screen, switches the playback screen to the selected attribute data.

More preferably, the plurality of attributes are at least genres, artists, and track names of the content data, and the control unit manages the content data by classifying the same to lists of a genre list, an artist list, and a track name list based on the attribute information, makes the display unit display any list of the lists, and, when any item is selected from among the displayed lists, makes the reproduction unit reproduce the content data corresponding to the selected item and switches the display content from the list to the playback screen containing the genre, artist name, and track name assigned to the content data, and, when the artist name is selected from among the genre, artist name, and track name on the playback screen, switches the playback screen to the artist list having the selected artist name as one of items.

More preferably, when one attribute data is selected from among the plurality of attribute data on the playback screen, the control unit makes the display unit display a list other than the list displayed immediately before the switching to the playback screen.

According to a second embodiment of the invention, there is provided a display control method when reproducing content data to which the attribute data concerning different plurality of attributes are assigned, including the steps of making a display unit display a playback screen containing at least one attribute data among the plurality of attribute data assigned to the content data to be reproduced and switching the display content of the display unit from the playback screen to a list relating to selected attribute data when one attribute data is selected from among the attribute data composing the playback screen.

Preferably, the method further includes the steps of detecting operation content input from an input unit, selecting one attribute data among attribute data composing the playback screen based on the operation content, and switching the display content of the display unit from the playback screen to a list relating to the selected attribute data.

Preferably, the method further includes the steps of, displaying a cursor on the playback screen, moving the cursor based on the operation content input from the input unit, and when one attribute data among the attribute data composing the playback screen is selected by the cursor, switching the display content of the display unit from the playback screen to the list relating to the selected attribute data.

More preferably, the method further includes a step of displaying attribute data by scrolling when attribute data at which the cursor is arranged, contains a predetermined number or more of letters.

Preferably, the method further includes a step of starting reproduction of selected content when one attribute data among the attribute data composing the playback screen is selected and continuing the reproduction of the content data being reproduced even after switching the display content of the display to the list corresponding to the specific attribute during reproduction of the content data.

More preferably, the method further includes a step of continuing the reproduction of the content data being reproduced after switching the display content of the display to the list corresponding to the specific attribute during reproduction of the content data until the reproduction of other content data is instructed.

Preferably, the method further includes a step of arranging the cursor at attribute data of selected content data as one item of the list when switching the display content of the display from the playback screen to the list relating to the selected attribute data.

Preferably, the method further includes a step of starting reproduction of content data corresponding to a selected item when any item of the list displayed on the display unit is selected, and switching the display content of the display from the list to the playback screen containing the plurality of attribute data assigned to the content data.

Preferably, the method further includes the steps of managing the content data classifying the same into a plurality of hierarchical levels based on the plurality of attributes, making the display unit display any list of the plurality of lists composed responsive to the attributes, and when any item is selected from among the displayed lists, reproducing content data corresponding to the selected item, switching the display content from the list to the playback screen containing the plurality of attribute data assigned to the content data, and when one among the plurality of attribute data in the playback screen is selected, switching the playback screen to the list relating to the selected attribute data.

More preferably, the plurality of attributes are at least genres, artists, and track names of content data, and the method further includes the steps of managing the content data classifying the same into lists of a genre list, an artist list, and a track name list based on the attribute information, making the display unit display any list of the lists, reproducing content data corresponding to a selected item when any item is selected from among displayed lists, switching the display content from the list to the playback screen containing the genre, artist name, and track name assigned to the content data, and when the artist name among the genre, artist name, and track name on the playback screen is selected, and switching the playback screen to the artist list having the selected artist name as one item.

More preferably, the method further includes, when one among the plurality of attribute data on the playback screen is selected, a step of making the display unit display a list other than the list displayed immediately before the switching to the playback screen.

According to the present invention, a reproduction device and display control method enabling a playback screen to be switched to a list screen corresponding to different attributes can be provided.

BRIEF DESCRIPTION OF THE DRAWINGS

These and other objects and features of the present invention will become clearer from the following description of the preferred embodiments given with reference to the attached drawings, wherein:

FIG. 1 is a view of the configuration of a portable audio player according to an embodiment of the present invention;

FIG. 3 is a table for explaining attributes of track data and attribute data;

FIGS. 10A to 10D are views showing the transition of a screen when searching from genres;

FIGS. 12A to 12C are views showing the transition of a screen when searching according to the year of release of the track or album etc.;

FIGS. 14A to 14F are views showing a playback screen and the transition of the screen according to an operation of the user;

FIG. 16 is a view for explaining a scroll display;

DESCRIPTION OF THE PREFERRED EMBODIMENTS

Figure 2C:
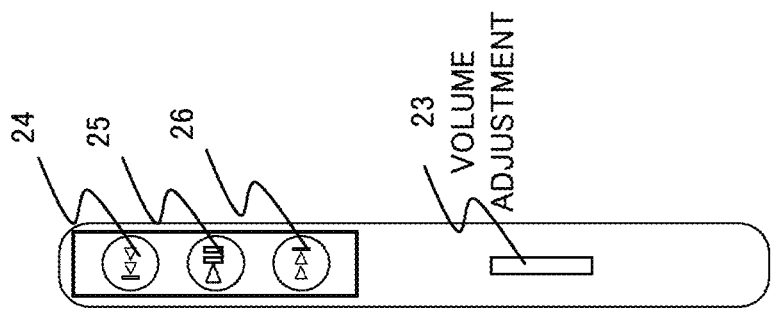
FIGS. 2A to 2C are views of an example of side surfaces and a front surface of a case of a portable audio player.

Below, a portable audio player according to an embodiment of the present invention will be explained.

FIG. 1 is a view of the overall configuration of a portable audio player 1 according to an embodiment of the present invention. As shown in FIG. 1, the portable audio player 1 has for example a headphone terminal 11, audio reproduction unit 12, LCD panel 13, central processing unit (CPU) 14, input device 15, synchronous dynamic random access memory (SDRAM) 16, flash memory 17, HDD 18, and universal serial bus (USB) interface 19 all connected via for example a data line 10.

The audio reproduction unit 12 outputs track data decoded by the CPU 14 in the form of an audio signal and plays back the track via the headphone terminal 11. Note that the track data of the present embodiment is an example of the content data of the present invention. The LCD panel 13 is provided on for example the front surface of a case of the portable audio player 1 and displays a variety of screens under the control of the CPU 14. The main screens displayed on the LCD panel 13 include for example a menu screen, initial search screen, setting screen, playback screen, and history screen. These screens are switched by the operation of the user via the input device 15. Further, the LCD panel 13 has for example a touch panel. A location on the screen touched by the user by his or her finger etc. is detected, and a detected location signal indicating the location is output to the CPU 14.

Figure 2B:
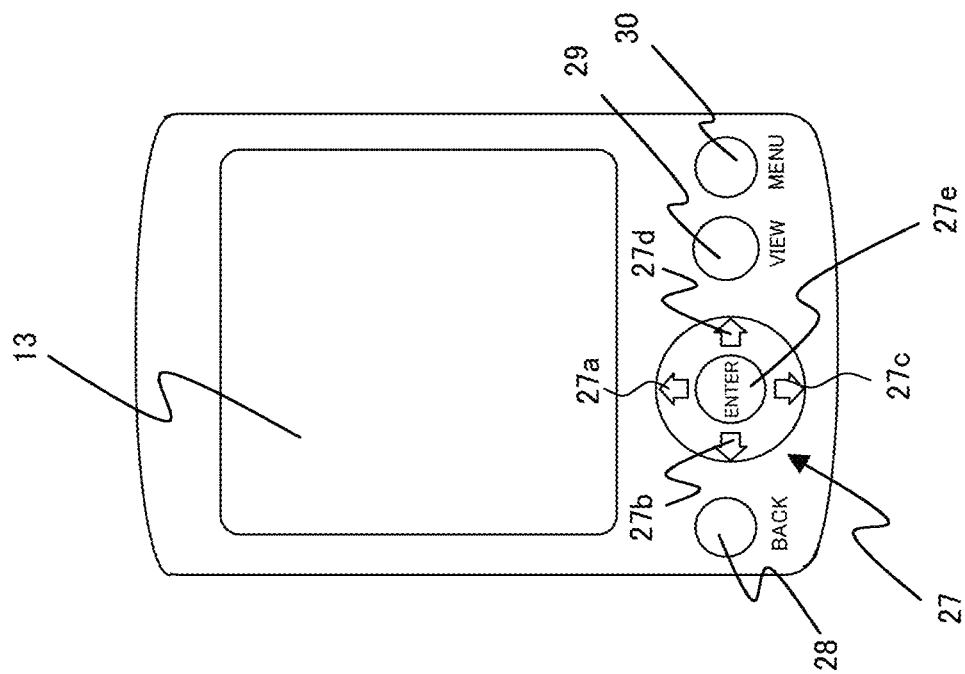
Figure 2A:
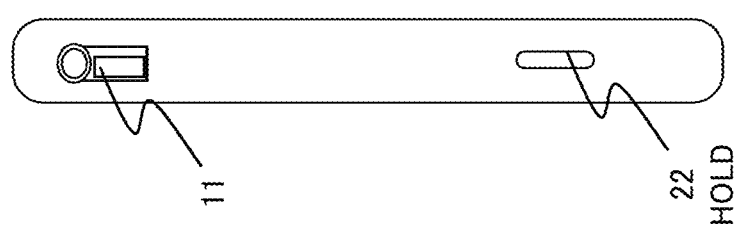

The input device 15 is, as shown in FIGS. 2A to 2C, configured as various keys provided on the case of the portable audio player 1 and operated by the user. FIGS. 2A to 2C are views showing example of the side surfaces and the front surface of the case of the portable audio player 1. That is, FIG. 2A and FIG. 2C are views showing examples of the side surfaces of the portable audio player 1, while FIG. 2B is a view showing an example of the front surface of the portable audio player 1.

As shown in FIG. 2A, one side surface of the portable audio player 1 is provided with the headphone terminal 11 and a HOLD key 22. As shown in FIG. 2B, the front surface of the portable audio player 1 is provided with the LCD panel 13, a cross key 27, a BACK key 28, a VIEW key 29, and a MENU key 30. The cross key 27 is configured by an up key 27a, a left key 27b, a down key 27c, a right key 27d, and an ENTER key 27e. As shown in FIG. 2C, the other side surface of the portable audio player 1 is provided with a rewind key 24, a play pause key 25, a forwarding key 26, and a volume adjustment dial 23. The SDRAM 16 temporarily stores the data etc. relating to the processing of the CPU 14. The flash memory 17 stores for example a program PRG for defining the operation of the CPU 14.

The HDD 18 has a storage capacity of for example several gigabytes to several tens of gigabytes and stores content data compressed by various compression methods or uncompressed track data etc. Further, the HDD 18 stores various play lists prepared by the CPU 14. The USB interface 19 is connected with the personal computer 3 and inputs/outputs data between the device and the personal computer 3. The data to be input and output here is for example track data, content data other than track data, list data, etc.

The CPU 14 centrally controls the operation of the portable audio player 1 of the present embodiment based on the program PRG read out from the flash memory 17. Further, the CPU 14 decodes the track data selected by the user and outputs it to the audio reproduction unit 12.

Note that the input device 15 and the touch panel of the LCD panel 13 of the present embodiment are examples of the input unit of the present invention, the LCD panel 13 of the present embodiment is an example of the display unit of the present invention, the audio reproduction unit 12 of the present embodiment is an example of the reproduction unit of the present invention, and the CPU 14 of the present embodiment is an example of the control unit of the present invention.

Below, the list data corresponding to the different attributes and the list screens will be explained. FIG. 3 is a table for explaining the attributes of the track data and the attribute data. As shown in FIG. 3, each track data has attribute data relating to different attributes. Here, "attribute" means for example the artist name, album name, genre name, and track name, while "attribute data" means data relating to the attribute.

Figure 4:
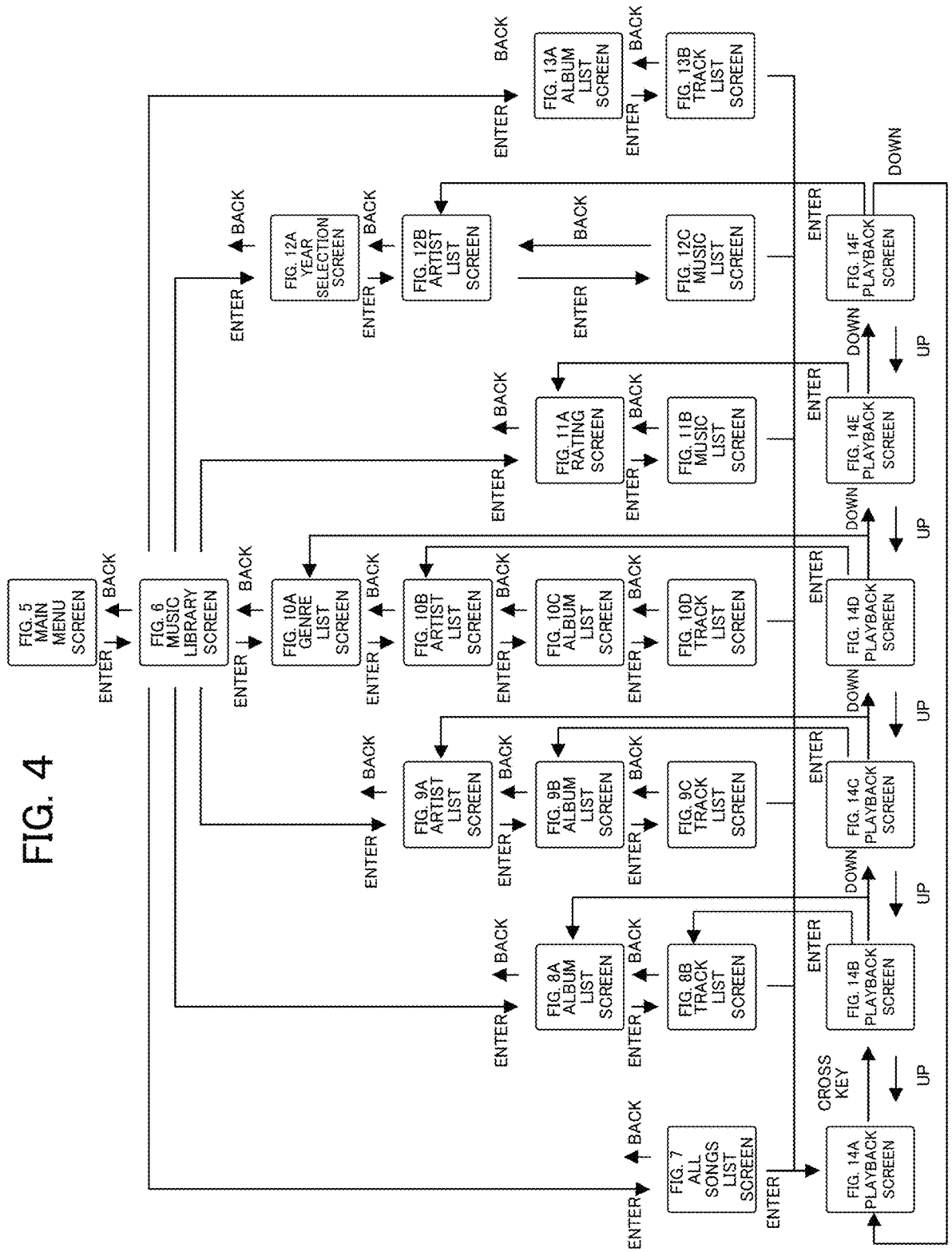
FIG. 4 is a diagram showing the correlation and transition of screens displayed on a liquid crystal display (LCD) panel of the portable audio player.

FIG. 4 is a diagram showing the correlation of the list screens and the operation method. In FIG. 4, "ENTER" means operation of the ENTER key 27e, "BACK" means operation of the BACK key 28, "DOWN" means operation of the down key 27c, and "UP" means operation of the up key 27a. Further, in each square indicating a screen, the number of the corresponding drawing and the title of each screen are described.

As shown in FIG. 4, the portable audio player 1 has a list having a hierarchical structure. Each list corresponds to an attribute.

Below, the procedures from the main menu screen until the track to be played is reached will be explained.

Figure 5:
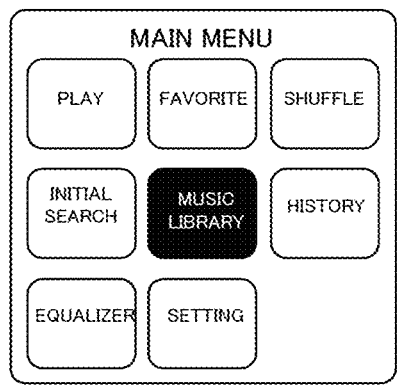
FIG. 5 is a view showing an example of a main menu screen.

The CPU 14 displays for example the main menu screen shown in FIG. 5 on the LCD panel 13. The main menu screen shown in FIG. 5 has for example a play button, favorite button, shuffle button, initial search button, music library button, history button, equalizer button, and setting button. The CPU 14 switches the main menu screen to the screen corresponding to each button by input by the user via the input device 15 or the touch panel of the LCD panel 13.

The inverted black/white button in FIG. 5 means the button selected by the input device 15 at present and moves corresponding to the input of the cross keys 27a to 27d. The inverted black/white button is selected by the ENTER key 27e. Further, the button may also be selected by directly depressing the button by a finger etc. via the touch panel of the LCD panel 13. The same operation method may also be used for the following screens. Below, the case where the music library button is selected on the menu screen will be explained.

Figure 6:
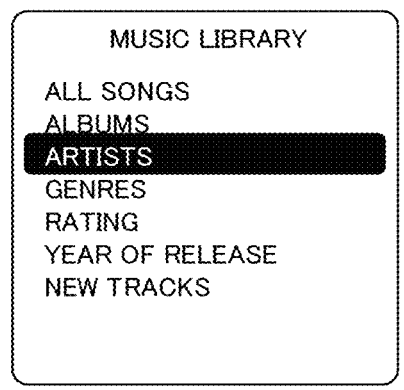
FIG. 6 is a view showing an example of a music library screen.

When the music library button is selected, the CPU 14 switches the screen of the LCD panel 13 to the music library screen shown in FIG. 6 for display. FIG. 6 is a view showing an example of the music library screen. The music library screen shown in FIG. 6 has for example an all songs button for displaying all track data as one list, an albums button for displaying a list of albums, an artists button for displaying a list of artists, a genres button for displaying a list of genres, a rating button for selection by rating (scoring), a year of release button for displaying a list classified according to the year of release, and a new tracks button for displaying a list of the track data stored in the HDD 18 recently.

The CPU 14 allows the user to select and determine options by moving the inverted white/black button of the music library screen shown in FIG. 6 by input via the input device 15 or the touch panel of the LCD panel 13 and displays a screen corresponding to the determination of the user.

Figure 7:
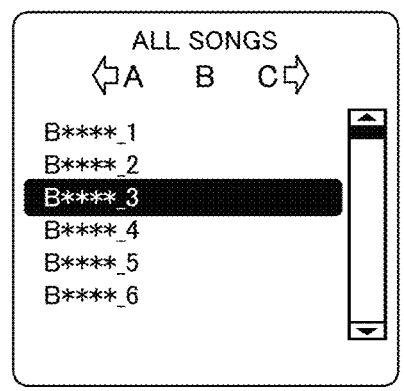
FIG. 7 is a view showing the transition of a screen when searching through all tracks.

When the all songs button is selected on the music library screen shown in FIG. 6, the CPU 14 displays the all music list screen shown in FIG. 7 on the LCD panel 13. FIG. 7 is a view showing the transition of the screen when searching through all songs. The all music list screen shown in FIG. 7 is a screen displaying an alphabetical list of the names of all tracks stored in the HDD 18. Here, it is also possible to display not the tracks stored in the HDD 18, but the names of tracks stored in an external server etc. When a track is selected on the all music list screen shown in FIG. 7, the playback screen of FIG. 14A is displayed, the CPU 14 decodes the selected track and sends it to the portable audio player 12, and the portable audio player 12 plays the selected track and outputs it from the headphone terminal 11.

Figure 8A:
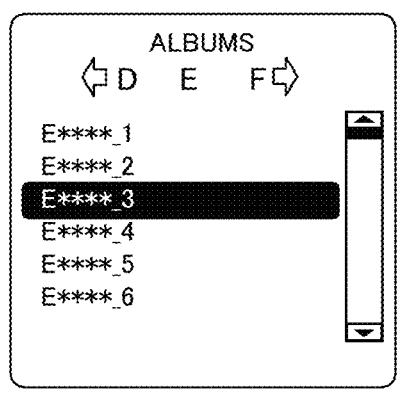
FIGS. 8A and 8B are views showing the transition of a screen when searching in units of albums.
Figure 8B:
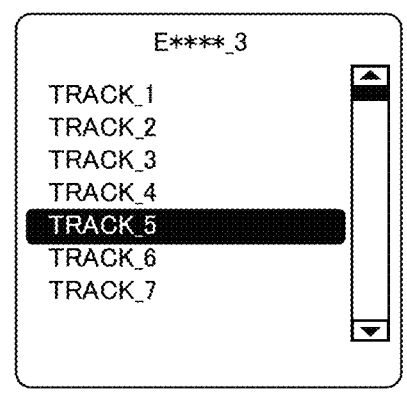

When the album button is selected on the music library screen shown in FIG. 6, the CPU 14 displays the album list screen as shown in FIG. 8A on the LCD panel 13. FIG. 8A and FIG. 8B are views showing the transition of the screen when searching in units of albums. The album list screen shown in FIG. 8A is a screen displaying an alphabetical list of all album names stored in the HDD 18, while the track list screen shown in FIG. 8B is a screen for displaying a list of tracks recorded in the album selected on the album list screen shown in FIG. 8A. When an album is selected on the album list screen shown in FIG. 8A, the CPU 14 displays a list of the tracks recorded in the selected album, that is, the track list screen shown in FIG. 8B, on the screen of the LCD panel 13. When a track is selected on the track list screen shown in FIG. 8B, the playback screen of FIG. 14A is displayed, the CPU 14 decodes the selected track and sends it to the portable audio player 12, and the portable audio player 12 plays and outputs the same from the headphone terminal 11.

Figure 9C:
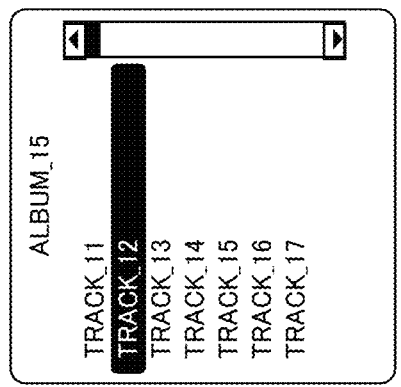
FIGS. 9A to 9C are views showing the transition of a screen when searching based on artists.
Figure 9B:
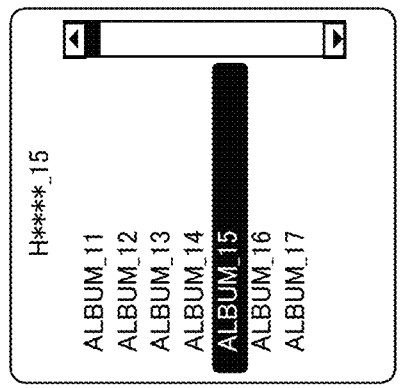
Figure 9A:
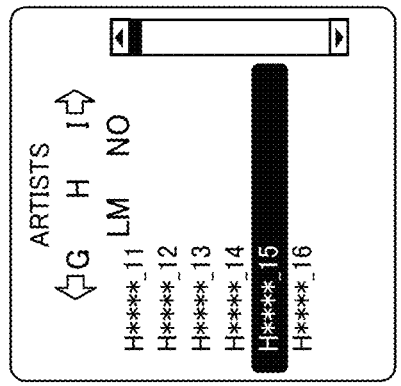

When the artists button is selected on the music library screen shown in FIG. 6, the CPU 14 displays the artist list screen as shown in FIG. 9A on the LCD panel 13. FIG. 9A, FIG. 9B, and FIG. 9C are views showing the transition of a screen when searching based on the artist. The artist list screen shown in FIG. 9A is a screen displaying an alphabetical list of artists of all tracks stored in the HDD 18. The album list screen shown in FIG. 9B is a screen for displaying an alphabetical list of albums of the artist selected on the artist list screen of FIG. 9A, while the track list screen shown in FIG. 9C is a screen for displaying a list of tracks recorded in the album selected on the album list screen shown in FIG. 9B. When an artist is selected on the artist list screen shown in FIG. 9A, the CPU 14 displays the album list screen of that artist shown in FIG. 9B on the LCD panel 13. When an album is selected on the album list screen shown in FIG. 9B, the CPU 14 displays the track list screen shown in FIG. 9C on the LCD panel 13. When a track is selected on the track list screen shown in FIG. 9C, the playback screen of FIG. 14A is displayed, the CPU 14 decodes the selected track and sends it to the portable audio player 12, and the portable audio player 12 plays and outputs the same from the headphone terminal 11.

When the genres button is selected on the music library screen shown in FIG. 6, the CPU 14 displays the genre list screen shown in FIG. 10A on the LCD panel 13. FIG. 10A, FIG. 10B, FIG. 10C, and FIG. 10D are views showing the transition of the screen when searching from the genres. The genres selection screen shown in FIG. 10A is the screen displaying the names of different genres in alphabetical order. The artist list screen shown in FIG. 10B is a screen displaying an alphabetical list of artists of the genre selected on the genre selection screen. The album list screen shown in FIG. 10C is a screen displaying an alphabetical list of albums of the artist selected on the artist list screen of FIG. 10B, while the track list screen shown in FIG. 10D is a screen displaying a list of tracks recorded in the album selected on the album list screen shown in FIG. 10C. When a genre is selected on the genre list screen shown in FIG. 10A, the CPU 14 displays the artist list screen of that genre shown in FIG. 10B on the LCD panel 13. When an artist is selected on the artist list screen shown in FIG. 10B, the CPU 14 displays the album list screen shown in FIG. 10C on the LCD panel 13. When an album is selected on the album list screen shown in FIG. 10C, the CPU 14 displays the track list screen shown in FIG. 10D on the LCD panel 13. When a track is selected on the track list screen shown in FIG. 10D, the playback screen of FIG. 14A is displayed, the CPU 14 decodes the selected track and sends it to the portable audio player 12, and the portable audio player 12 plays and outputs it from the headphone terminal 11.

Figure 11A:
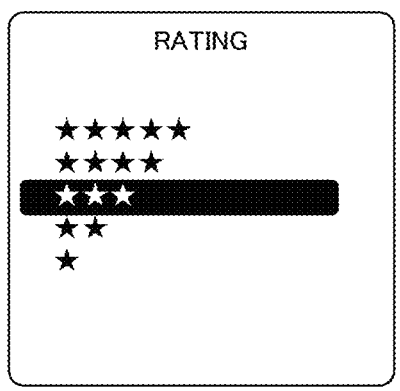
FIGS. 11A and 11B are views showing the transition of a screen when searching based on ratings assigned by the user in the past.
Figure 11B:
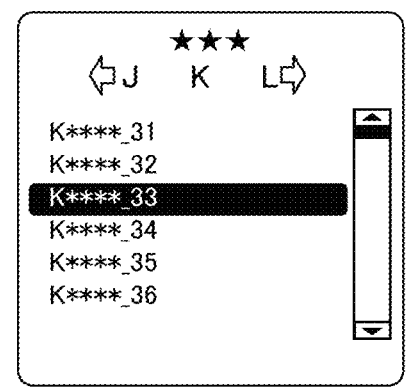

When the rating button is selected on the music library screen shown in FIG. 6, the CPU 14 displays the rating screen as shown in FIG. 11A on the LCD panel 13. FIG. 11A and FIG. 11B are views showing the transition of the screen when searching based on ratings assigned by the user in the past. The rating screen shown in FIG. 11A is a screen for displaying the score (rating). This rating is previously assigned to each track by the user by for example a five-step evaluation and indicates the degree by which the user favors each track. The music list screen shown in FIG. 11B is a screen displaying an alphabetical list of tracks having the rating selected on the rating screen shown in FIG. 11A. When the rating (represented by the number of ★ in FIG. 11A) is selected on the rating screen shown in FIG. 11A, the CPU 14 displays the music list screen shown in FIG. 11B for the corresponding rating on the LCD panel 13. Here, the rating is previously assigned by the user. When a track is selected on the music list screen shown in FIG. 11B, the playback screen shown in FIG. 14A is displayed, the CPU 14 decodes the selected track and sends it to the portable audio player 12, and the portable audio player 12 plays and outputs the same from the headphone terminal 11.

When the year of release button is selected on the music library screen shown in FIG. 6, the CPU 14 displays the year of release selection screen as shown in FIG. 12A on the LCD panel 13. FIG. 12A, FIG. 12B, and FIG. 12C are views showing the transition of the screen when searching according to the year in which a track or album etc. was released. The year of release selection screen shown in FIG. 12A is a screen for selecting the year. The artist list screen shown in FIG. 12B is a screen displaying an alphabetical list of artists having tracks released in the year selected on the year of release selection screen of FIG. 12A. The music list screen shown in FIG. 12C is a screen displaying a list of tracks released by the artist selected on the artist list screen shown in FIG. 12B in the year selected in FIG. 12A. When a year is selected on the year of release selection screen shown in FIG. 12A, the CPU 14 displays a list of artists releasing tracks in that year, that is, the artist list screen shown in FIG. 12B, on the LCD panel 13. When an artist is selected on the artist list screen shown in FIG. 12B, the CPU 14 displays the music list screen shown in FIG. 12C on the LCD panel 13. When a track is selected on the music list screen shown in FIG. 12C, the playback screen of FIG. 14A is displayed, the CPU 14 decodes the selected track and sends it to the portable audio player 12, and the portable audio player 12 plays and outputs the same from the headphone terminal 11.

Figure 13A:
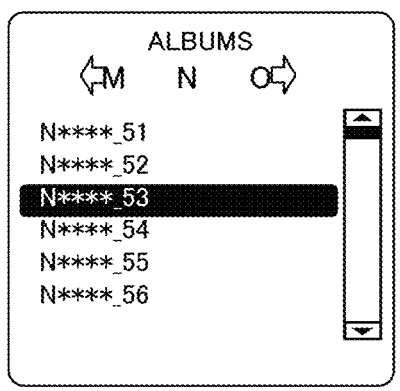
FIGS. 13A and 13B are views showing the transition of a screen when selecting from among albums or tracks recently added to a hard disk drive (HDD)
Figure 13B:
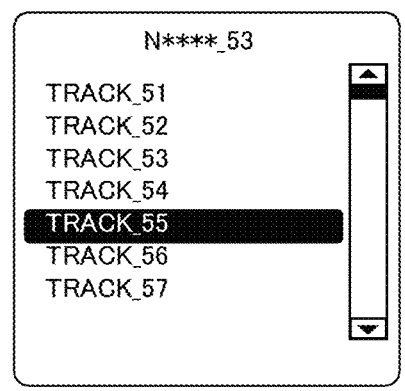

When the new tracks button is selected on the music library screen shown in FIG. 6, the CPU 14 displays a list of the recently added albums, that is, the album list screen shown in FIG. 13A, on the LCD panel 13. FIG. 13A and FIG. 13B are views showing the transition of the screen when selecting from among albums or tracks recently added to the HDD 18. The album list screen shown in FIG. 13A is a screen displaying an alphabetical list of albums recently added to the HDD 18. The track list screen shown in FIG. 9B is a screen displaying an alphabetical list of the tracks recorded in the album selected on the album list screen of FIG. 13B. When an album is selected on the album list screen shown in FIG. 13A, the CPU 14 displays the track list screen shown in FIG. 13B on the LCD panel 13. When a track is selected on the track list screen shown in FIG. 13B, the playback screen of FIG. 14A is displayed, the CPU 14 decodes the selected track and sends it to the portable audio player 12, and the portable audio player 12 plays and outputs the same from the headphone terminal 11.

The operation screen displayed on the LCD panel 13 therefore changes as explained above. The screens change on the basis of input by the ENTER key 27e or the touch panel as mentioned above, but this operation is a reversible operation. It is possible to return to the screen immediately before the present screen by input by the BACK key 28.

Note that, as explained above, the screens display various lists, for example, the artist list, album list, track list, and music list. As these lists, when transferring for example track data from the personal computer 3 to the HDD 18 via the USB interface 19, a list previously prepared on the personal computer 3 may be simultaneously transferred and stored in the HDD 18 and called up from the HDD 18 and used when necessary, or the CPU 14 may prepare a list and display it based on the attribute data of each track data when the list becomes necessary.

Next, the playback screen will be explained. FIGS. 14A to 14F are views showing the playback screen and the transition of the screen according to an operation of the user.

FIG. 14A shows the initial screen during playback of a certain track. As shown in FIG. 14A, the playback screen displays the different attribute data of the track being played back. "Track_X" in FIG. 14A indicates the name of the track being played back, "E**_3" indicates the album name, "H_15" indicates the artist name, "Rock" indicates the genre name, "★★★" indicates the rating, and "2004" indicates the year of release. Note that the attribute data displayed in FIGS. 14A to 14F is an example. In the portable audio player 1 of the present invention, when any of the cross keys 27a to 27d is depressed in the state shown in FIG. 14A, the cursor appears at a position of "E**_3" indicating the album name as shown in FIG. 14B, and selection by the ENTER key 27e becomes possible. Here, as shown in FIG. 4 and FIGS. 14A to 14F, the cursor moves up and down along the attribute data of the playback screen by depression of the top/bottom keys 27a and 27c, whereupon selection by the ENTER key 27e becomes possible.

Here, for example, when the ENTER key 27e is depressed in FIG. 14B, that is, in a state where the cursor is placed over the album name of the track being played back at present, as shown in FIG. 4, the CPU 14 switches the display of the LCD panel 13 to the track list screen for that album shown in FIG. 8B. In the same way, when the ENTER key 27e is depressed in FIG. 14C, that is, in the state where the cursor is placed over the artist name of the track being played back, as shown in FIG. 4, the CPU 14 switches the display of the LCD panel 13 to the album list screen for that artist shown in FIG. 9B.

In the same way, when the ENTER key 27e is depressed in FIG. 14D, that is, in the state where the cursor is placed over the genre name of the track being played back, as shown in FIG. 4, the CPU 14 switches the display of the LCD panel 13 to the artist list screen for that genre shown in FIG. 10B. In the same way, when the ENTER key 27e is depressed in FIG. 14E, that is, in the state where the cursor is placed over the rating of the track being played back, as shown in FIG. 4, the CPU 14 switches the display of the LCD panel 13 to the rating screen shown in FIG. 11A.

In the same way, when the ENTER key 27e is depressed in FIG. 14F, that is, in the state where the cursor is placed over the year of release of the track being played back, as shown in FIG. 4, the CPU 14 switches the display of the LCD panel 13 to the artist list screen for tracks released in that year shown in FIG. 12B.

Namely, according to the portable audio player 1 of the present embodiment, regardless of the list screens going back until the track to be played is determined, the display of the LCD panel 13 is immediately switched to the list screen relating to the attribute of the attribute data selected on the playback screen. That is, for example, even in the case where the track to be played is determined through the menu screen of FIG. 5, the artist list screen of FIG. 9A, the album list screen of FIG. 9B, and the track list screen of FIG. 9C, when the rating is selected by the cursor on the playback screen of that track as in FIG. 14E, the display of the LCD panel 13 is immediately switched to the rating screen of FIG. 11A.

As another embodiment, when an album name is selected by the cursor on the playback screen as in FIG. 14B, control for switching the playback screen to the album list screen of FIG. 8A can be considered. That is, the screen is switched to a list including the item selected on the playback screen. In the same way, when an artist name is selected, the display content is switched from FIG. 14C to FIG. 9A, while when a genre is selected, switching of the display content from FIG. 14D to FIG. 10A may be considered.

Further, in the playback screens of FIGS. 14A to 14D, where the number of letters of the attribute data over which the cursor is placed is larger than a predetermined number and the letters cannot all be displayed on the screen, the letters of that attribute data are displayed by scrolling. Specifically, for example as shown in FIG. 15A, when displaying attribute data having a number of letters too large to be displayed on the playback screen, for example the track name "Track_abcdefghijklmnopqrstu", album name "Album_abcdefghijklmnopqrstu", and artist name "Artist_abcdefghijklmnopqrstu", first, as shown in FIG.

15B, the letters within the displayable range are displayed from the first letter of the attribute data.

Figure 15A:
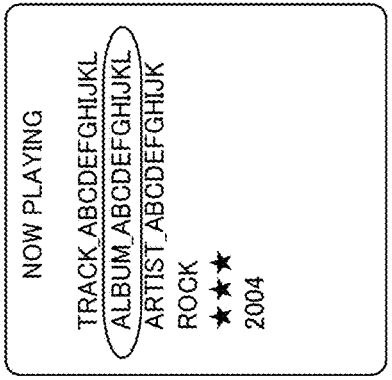
FIGS. 15A to 15E are views for explaining a scroll display of attribute data on the playback screen.
Figure 15B:
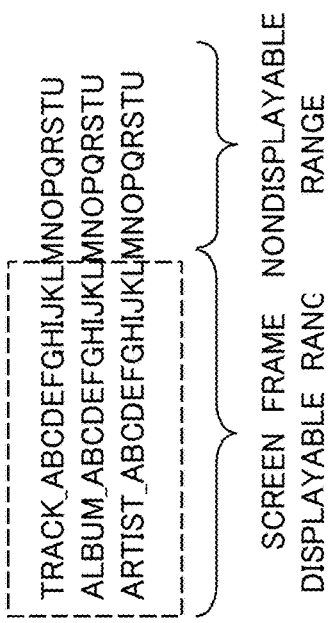
Figure 15E:
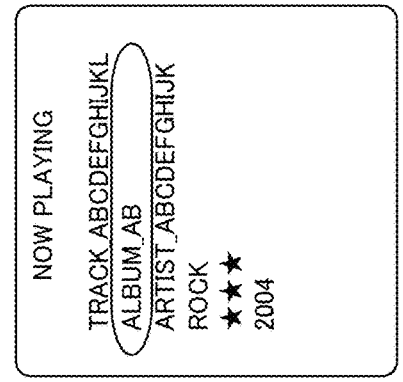

Next, in order to display the letters of the attribute data over which the cursor is placed within the nondisplayable range in FIG. 15A, scroll display is carried out. Namely, for example, as shown in FIG. 15C, the processing of displaying a portion "mnopqrstu" of the attribute data over which the cursor is placed, i.e., the album name "Album_abcdefghijklmnopqrstu", which was not displayed in FIG. 15B, one letter by one letter along with the elapse of time, and deleting the displayed portion "Album_abcdefghijkl" one letter by one letter from the first letter and shifting the remaining letters leftward one letter by one letter is carried out. In FIG. 15C, the letters which newly appear by scrolling are underlined.

Figure 15D:
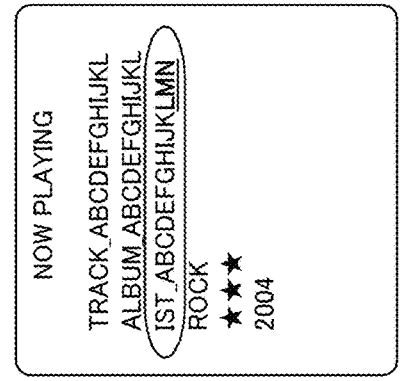
Figure 15C:
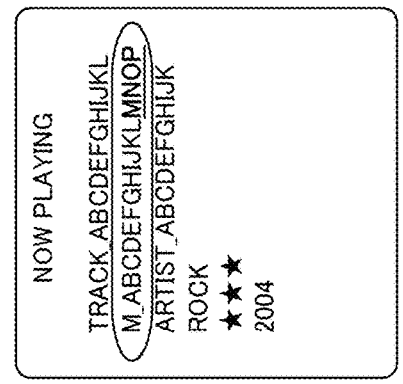

Further, when the attribute data over which the cursor is placed changes, as shown in FIG. 15D, the scroll display of the attribute data over which the cursor had been placed is stopped, and the scroll display of the attribute data over which the cursor is newly placed is started. In FIG. 15D as well, the letters which newly appear by scrolling are underlined.

Note that when the number of letters of the attribute data over which the cursor is placed is not more than the predetermined number and can be displayed on the playback screen, the scroll display is not carried out as in FIG. 15E. Of course, in this case, even if there is other attribute data having a number of letters larger than the predetermined number on the playback screen, the scroll display is not carried out so far as the cursor is not placed over it.

A concrete example of the scroll display is shown in FIG. 16. As shown in (a) to (d), in the scroll display, the letters on the left end of the screen disappear one by one while the letters which could not be displayed appear one by one on the right end along with the elapse of time. Further, when time further passes and the end of the attribute data is scrolled to, letters may be prevented from appearing from the right end again until all letters disappear once from the left end as shown in FIG. 16D or scroll display may be again carried out from the first letter of the attribute data with exactly a predetermined number of spaces from the last letter of the attribute data as shown in FIG. 16E.

Figure 17:
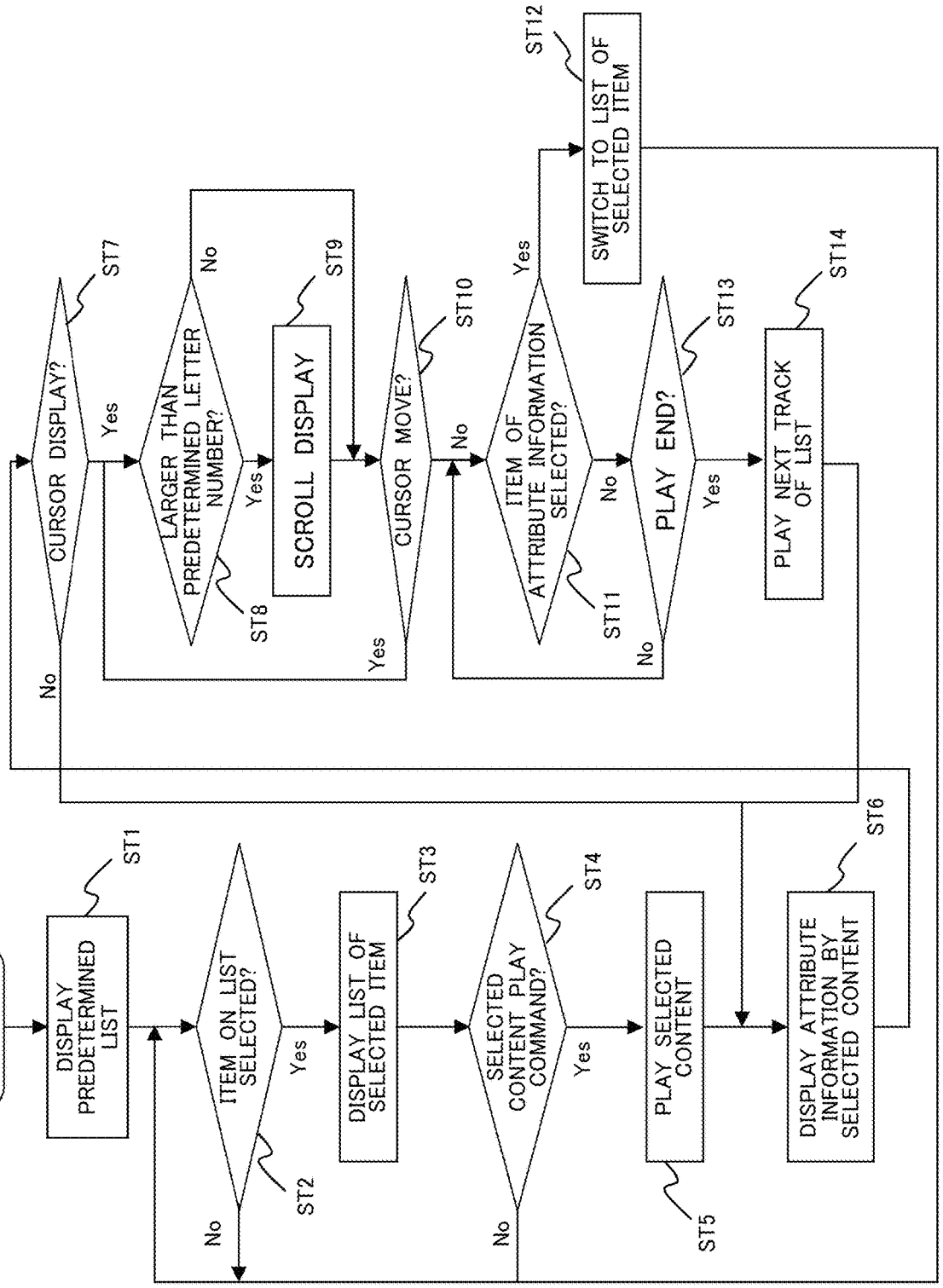
FIG. 17 is a flow chart showing an example of operation of the portable audio player.

Next, an example of operation of the portable audio player 1 will be explained. FIG. 17 is a flow chart showing an example of operation of the portable audio player 1.

Step ST1

The CPU 14 displays a predetermined list on the LCD panel 13. The predetermined list is for example the music library screen shown in FIG. 6.

Step ST2

The CPU 14 judges whether an item on the list displayed at step ST1, for example, an artist, was selected. It proceeds to step ST3 when it was, while re-does step ST2 when it was not.

Step ST3

The CPU 14 displays the list of the item selected at step ST2 on the LCD panel 13. For example, when an artist is selected, the artist selection screen shown in FIG. 9A is displayed.

Step ST4

The CPU 14 judges whether there is a command to play the content selected on the list displayed at step ST3. When there is no play command, the routine returns to step ST2, while when there is a play command, the routine proceeds to step ST5. Note that, specifically, the play command is given by selecting a track by for example the all songs selection screen of FIG. 7, the track list screens of FIG. 8B, FIG. 9C, FIG. 10D, FIG. 11B, and FIG. 13B, and the music selection screen of FIG. 12C and depressing the ENTER key 27e.

Step ST5

The CPU 14 plays the track for which the play command was issued at step ST4. Specifically, for example, it plays the track for which the play command was issued on the track list screen of FIG. 9C.

Step ST6

The CPU 14 displays the attribute data of the content started to be played at step ST5 on the LCD panel 13. Namely, for example, as in FIG. 14A, the track name, album name, artist name, genre name, rating, year of release, etc. of the track started to be played are displayed.

Step ST7

The CPU 14 proceeds to step ST8 when there is an operation for displaying the cursor on the playback screen displayed on the LCD panel 13 (input by up key 27a or down key 27c) at step ST6, while returns to step ST6 and waits for input when there was no operation.

Step ST8

The CPU 14 judges whether or not the number of letters of the attribute data over which the cursor was placed at step ST7 is larger than a predetermined number (number of letters which can be displayed on the playback screen), proceeds to step ST9 when the number of letters is larger, while proceeds to step ST10 when not.

Step ST9

The CPU 14 displays the attribute data by scrolling.

Step ST10

The CPU 14 returns to step ST8 when there was an operation for moving the cursor (input of the up key 27a or the down key 27c), while proceeds to step ST11 where there was no operation.

Step ST11

The CPU 14 judges whether the attribute data over which the cursor is placed at present was selected by operation by the input device 15 or the touch panel on the playback screen, proceeds to step ST12 when the attribute data was selected, while proceeds to step ST13 when it was not.

Step ST12

The CPU 14 displays a list corresponding to the attribute data selected at step ST11 on the LCD panel 13. Namely, as shown in FIG. 4, on the LCD panel 13, the CPU 14 displays the track list of the album shown in FIG. 8B when the album name of the track being played back shown in FIG. 14B is selected, displays the album list of the artist shown in FIG. 9B when the artist name shown in FIG. 14C is selected, displays the artist list of the genre shown in FIG. 10B when the genre shown in FIG. 14D is selected, displays the rating selection screen shown in FIG. 11A when the rating shown in FIG. 14E is selected, and displays the artist list of tracks released in the year shown in FIG. 12B when the year of release shown in FIG. 14F is selected.

Note that the CPU 14 continues to play back the track being played even after switching the screen until a play command of the next track is given.

Step ST13

The CPU 14 judges whether or not the playback of the track being played ends, returns to step ST11 when it does not, while proceeds to step ST14 when it does.

Step ST14

The CPU 14 plays the next track of the list including the track finished being played at step ST13 irrespective of the screen displayed on the LCD panel 13, then returns to step ST6. The list to which the track belongs is for example the track list shown in FIG. 8B when the cursor is advanced from the music library screen shown in FIG. 6 to the album list screen shown in FIG. 8A and the track list screen shown in FIG. 8B in this sequence and the present track is selected. Namely, it means any list among the screens shown in FIG. 7, FIG. 8B, FIG. 9C, FIG. 10D, FIG. 11B, FIG. 12C, and FIG. 13B displayed for reaching the track finished being played. Namely, for example, the artist list screen is displayed on the LCD panel 13 at present. Even in the selection waiting state, irrespective of that screen, the CPU 14 starts to play the next track of the list to which the above track belongs.

Note that, in the above example of operation, the explanation was given of the case where the lists were followed as shown in FIG. 4 from the music library screen shown in FIG. 6, but the portable audio player 1 of the present embodiment may play back tracks according to a play list etc. previously prepared and stored in the HDD 18. In this case, the "next track of the list" played back at step ST14 becomes the next track of that play list. This play list may be prepared on the portable audio player 1 or a list prepared on a PC may be stored in the HDD 18 as it is when transferring the tracks from the PC.

As explained above, when the user wants to play a track related to a truck currently being played, according to the portable audio player 1 of the present embodiment, it is possible to select the attribute data displayed during playback of the current track embodiment display a list corresponding to that attribute, therefore it is possible to display a list of the tracks desired by a simple operation and in a relatively short time in comparison with the conventional case. Further, according to the portable audio player 1 of the present embodiment, regardless of the list screens followed until the track to be played is determined, the display of the LCD panel 13 is immediately switched to the list screen concerning the attribute of the attribute data selected on the playback screen, therefore the screen display of the LCD panel 13 can be switched to the desired list screen without forcing troublesome operation on the user.

Figure 18:
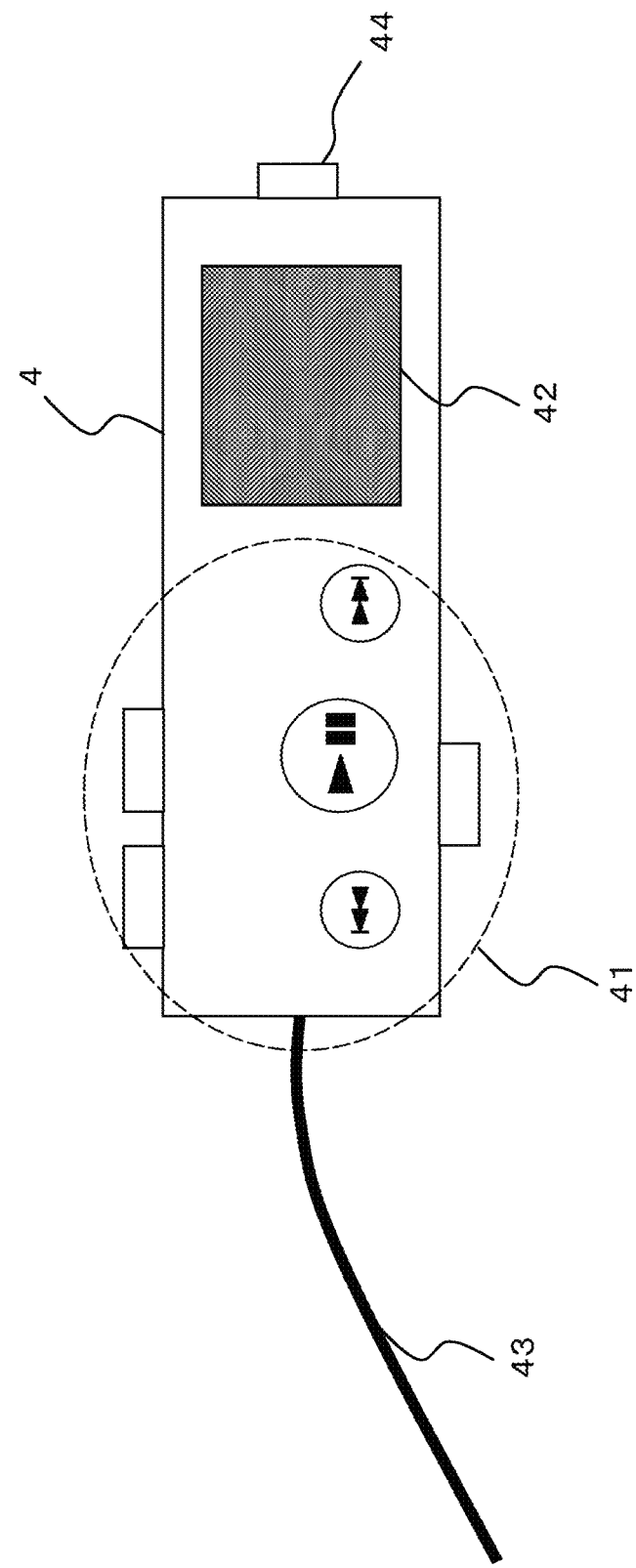
FIG. 18 is a diagram showing an example of the front surface of the case of a remote controller.

Note that, in the present embodiment, various keys included in the input device 15 and the touch panel of the LCD panel 13 provided on the case of the portable audio player 1 were exemplified as the inputting means of the present invention, and the LCD panel 13 was exemplified as the display, but for example, an input device 41 including various buttons disposed on the case of a remote controller 4 shown in FIG. 18 may be used as the inputting means, and an LCD panel 42 may be used as the display. FIG. 18 is a diagram showing an example of the front surface of the case of the remote controller 4.

As shown in FIG. 18, the remote controller 4 has the input device 41, an LCD panel 42, a cable 43, and a headphone terminal 44. The input device 41 is containing various keys disposed on the front surface, side surfaces, and the back surface of the remote controller 41 and receives input by operation of the user in the same way as the input device 15 of the portable audio player 1.

The LCD panel 42 performs for example the same display as that of the LCD panel 13 of the portable audio player 1 via the cable 43 mentioned later by the CPU 14 of the portable audio player 1. The cable 43 is a bi-directional (two way) communication device connected with for example the headphone terminal 11 of the portable audio player 1, transferring the input by the operation of the user received by the input device 41 to the CPU 14 of the portable audio player 1, transferring the signal issued by the CPU 14 of the portable audio player 1 for displaying the screen on the LCD panel 42 to the remote controller 4 side, or transferring the audio signal of the track played back by the audio reproduction unit 12 of the portable audio player 1 to the headphone terminal 44 on the remote controller 4 side.

The headphone terminal 44 connects a headphone or other output device and outputs the audio signal of the track played by the audio reproduction unit 12 of the portable audio player 1 transferred via the cable 43 to the output apparatus.

The present invention is not limited to the above embodiments. Namely, those skilled in the art can perform a variety of modifications, combinations, sub-combinations, and substitutions concerning the components of the embodiments mentioned above within the technical range of the present invention or equivalent range to that.

In the above embodiments according to the present invention, an LCD panel 13 was used as the display, but as the display device, use may also be made of for example an organic EL (electroluminescence) panel.

Note that, in the above embodiments according to the present invention, the data was communicated via the personal computer 3 and the USB interface 19, but the present invention is not limited to this. For example, the data can be communicated via the server etc. distributing the track data and wireless communications such as infrared communication and a wireless LAN.

Further, in the above embodiments according to the present invention, the track data was explained as an example of the content data, but the present invention is not limited to this. The content data may be for example movies, still images, and text data.

Further, the information displayed on the playback screen may include, other than that explained in the above embodiments, the title, main cast, director, genre, country, year of release, production company, distribution company, and so on in for example the case where the content data is moving picture data such as a movie. Further, when the content data is still image data such as photos, the information may include the date taken, size, type of photo (scene, picture etc.), and photographer. Further, when the content data is text data such as with electronic publishing, the information may include the title, author, genre, publishing company, and so on.

Further, in the above embodiments, the track data, that is, the content data, was stored in the HDD 18, but the present invention is not limited to this. Namely, the content data may also be stored in a flash memory etc.

Further, the above embodiments were explained with reference to a portable audio player as an example, but the present invention is not limited to this. It may be any reproduction device storing content data, performing playback, and having a display function. For example, it may be an HDD recorder, electronic book terminal, DVD player, digital camera, or personal computer.

What is claimed:
1. A method comprising:
  during reproduction of a content from among a plurality of contents by a reproduction device, displaying on a display of the reproduction device a first screen comprising attribute information for the content being reproduced, the attribute information for the content being reproduced comprising a first attribute and a second attribute, wherein the attribute information in the first screen includes a first value, for the first attribute, of the content being reproduced and a second value, for the second attribute, of the content being reproduced, and the first screen comprises a first select- able item for the first value for the first attribute and a second selectable item for the second value for the second attribute;
detecting a user interaction with the first screen when the first screen is displayed on the display;
in response to determining that the user interaction with the first screen is a selection by a user of the first selectable item for the first value for the first attribute in the first screen,
 determining content to be included in a first set of one or more contents of the plurality of contents based at least in part on the first value of the content being reproduced, that was selected by the user; and
 switching the display from the first screen to a second screen comprising a first listing of one or more values corresponding to the one or more contents in the first set, wherein each of the one or more values is associated with an attribute different than the first attribute;
in response to determining that the user interaction with the first screen is a selection by the user of the second selectable item for the second value for the second attribute in the first screen,
 determining content to be included in a second set of one or more contents of the plurality of contents based at least in part on the second value of the content being reproduced, that was selected by the user; and
 switching the display from the first screen to a third screen comprising a second listing of one or more values corresponding to the one or more contents in the second set, wherein each of the one or more values is associated with an attribute different than the second attribute; and
continuing the reproduction of the content being reproduced after switching the display from the first screen to the second screen or the third screen.

2. The method of claim 1, wherein:
determining content to be included in the first set based at least in part on the first value of the content being reproduced comprises determining, from the plurality of contents, one or more contents having the first value.

3. The method of claim 2, wherein:
the selection by the user of the first selectable item is a selection by the user of text of the first value in the first screen during display of the first screen; and
determining, from the plurality of contents, one or more contents having the first value comprises determining the one or more contents having the first value when the selection by the user of the first selectable item is the selection by the user of text of the first value in the first screen.

4. The method of claim 1, wherein:
the content being reproduced is a song, and
determining content to be included in the first set based at least in part on the first value of the content being reproduced comprises:
 determining an album of the song; and
 determining, from the plurality of contents, one or more contents having the same album as the album of the song; and
 including the one or more contents having the same album in the first set.

5. The method of claim 1, wherein switching the display from the first screen to the third screen comprising the second set comprises displaying on the display a previously-displayed screen from which the content being reproduced was selected by the user for reproduction, the previously-displayed screen comprising the second set of one or more contents, the second set of one or more contents comprising the content being reproduced.

6. The method of claim 1, wherein the second screen displays the first value for the first attribute but not the first selectable item corresponding to the first value.

7. The method of claim 1, wherein the third screen displays the second value for the second attribute but not the second selectable item corresponding to the second value.

8. The method of claim 1, wherein:
the first value comprises text identifying the first value; and
displaying on the display of the reproduction device the first screen comprising attribute information for the content being reproduced during reproduction of the content comprises:
 determining, for the first value, whether a number of characters included in the text of the first value is greater than a first number;
 in response to determining that the number of characters included in the text of the first value is greater than the first number, scrolling a display of the text of the first value in the first screen, the scrolling comprising displaying a first portion of the text of the first value at a first time during display of the first screen and displaying a second portion of the text of the first value at a second time during display of the first screen.

9. The method of claim 1, wherein the attribute different than the first attribute is the second attribute.

10. The method of claim 1, wherein the attribute different than the second attribute is the first attribute.

11. A reproduction device comprising:
a display;
at least one processor; and
at least one non-transitory computer-readable storage having encoded thereon executable instructions that, when executed by the at least one processor, cause the at least one processor to perform a method, the method comprising:
 during reproduction of a content from among a plurality of contents by the reproduction device, displaying on the display of the reproduction device a first screen comprising attribute information for the content being reproduced, wherein the attribute information in the first screen includes a first value of a first attribute and a second value of a second attribute, and the first screen comprises a first selectable item for the first value of the first attribute and a second selectable item for the second value of the second attribute;
 in response to detecting a user interaction with the first screen that is a selection by a user of the first selectable item for the first value of the first attribute in the first screen when the first screen is displayed on the display,
  determining content to be included in a first set of one or more contents of the plurality of contents based at least in part on the first value of the content being reproduced, that was selected by the user; and
  switching the display from the first screen to a second screen comprising a first listing of one or more values corresponding to the one or more contents in the first set, wherein each of the one or more values is associated with an attribute different than the first attribute;

in response to detecting a user interaction with the first screen that is a selection by the user of the second selectable item for the second value of the second attribute in the first screen when the first screen is displayed on the display, determining content to be included in a second set of one or more contents of the plurality of contents based at least in part on the second value of the content being reproduced, that was selected by the user; and switching the display from the first screen to a third screen comprising a second listing of one or more values corresponding to the one or more contents in the second set, wherein each of the one or more values is associated with an attribute different than the second attribute; and continuing the reproduction of the content being reproduced after switching the display from the first screen to the second screen or the third screen.

12. The reproduction device of claim 11, wherein:
the selection by the user of the first selectable item is a selection by the user of text of the first value in the first screen during display of the first screen; and
determining content to be included in the first set based at least in part on the first value of the content being reproduced comprises, when the selection by the user of the first selectable item is the selection by the user of text of the first value in the first screen, determining, from the plurality of contents, one or more contents having the first value.

13. The reproduction device of claim 11, wherein:
the content being reproduced is a song, and
determining content to be included in the first set based at least in part on the first value of the content being reproduced comprises:
   determining an album of the song; and
   determining, from the plurality of contents, one or more contents having the same album as the album of the song; and
   including the one or more contents having the same album in the first set.

14. The reproduction device of claim 11, wherein switching the display from the first screen to the third screen comprising the second set comprises displaying on the display a previously-displayed screen from which the content being reproduced was selected by the user for reproduction, the previously-displayed screen comprising the second set of one or more contents, the second set of one or more contents comprising the content being reproduced.

15. The reproduction device of claim 11, wherein the second screen displays the first value for the first attribute but not the first selectable item corresponding to the first value and the third screen displays the second value for the second attribute but not the second selectable item corresponding to the second value.

16. At least one non-transitory computer-readable storage having encoded thereon executable instructions that, when executed by at least one processor, cause the at least one processor to perform a method, the method comprising:

during reproduction of a content from among a plurality of contents by a reproduction device, displaying on a display of the reproduction device a first screen comprising attribute information for the content being reproduced, wherein the attribute information in the first screen includes a first value of a first attribute and a second value of a second attribute, and the first screen comprises a first selectable item for the first value of the first attribute and a second selectable item for the second value of the second attribute;

in response to detecting a user interaction with the first screen that is a selection by a user of the first selectable item for the first value of the first attribute in the first screen when the first screen is displayed on the display, determining content to be included in a first set of one or more contents of the plurality of contents based at least in part on the first value of the content being reproduced, that was selected by the user; and switching the display from the first screen to a second screen comprising a first listing of one or more values corresponding to the one or more contents in the first set, wherein each of the one or more values is associated with an attribute different than the first attribute;

in response to detecting a user interaction with the first screen that is a selection by the user of the second selectable item for the second value of the second attribute in the first screen when the first screen is displayed on the display, determining content to be included in a second set of one or more contents of the plurality of contents based at least in part on the second value of the content being reproduced, that was selected by the user; and switching the display from the first screen to a third screen comprising a second listing of one or more values corresponding to the one or more contents in the second set, wherein each of the one or more values is associated with an attribute different than the second attribute; and continuing the reproduction of the content being reproduced after switching the display from the first screen to the second screen or the third screen.

17. The at least one non-transitory computer-readable storage of claim 16, wherein:
the selection by the user of the first selectable item is a selection by the user of text of the first value in the first screen during display of the first screen; and
determining content to be included in the first set based at least in part on the first value of the content being reproduced comprises, when the selection by the user of the first selectable item is a selection by the user of text of the first value in the first screen, determining, from the plurality of contents, one or more contents having the first value.

18. The at least one non-transitory computer-readable storage of claim 16, wherein:
the content being reproduced is a song, and
determining content to be included in the first set based at least in part on the first value of the content being reproduced comprises:
   determining an album of the song; and
   determining, from the plurality of contents, one or more contents having the same album as the album of the song; and
   including the one or more contents having the same album in the first set.

19. The at least one non-transitory computer-readable storage of claim 16, wherein the second screen displays the first value for the first attribute but not the first selectable item corresponding to the first value and the third screen displays the second value for the second attribute but not the second selectable item corresponding to the second value.

* * * * *